(12) United States Patent
Pfeiffer et al.

(10) Patent No.: US 7,721,390 B2
(45) Date of Patent: May 25, 2010

(54) HANDLE FOR HAND-HELD POWER TOOL

(75) Inventors: Ralf Pfeiffer, Sontheim (DE); Georg Holzmeier, Unlermeilingen (DE)

(73) Assignee: Hilti Aktiengesellschaft, Schaan (LI)

( * ) Notice: Subject to any disclaimer, the term of this patent is extended or adjusted under 35 U.S.C. 154(b) by 687 days.

(21) Appl. No.: 11/643,231

(22) Filed: Dec. 20, 2006

(65) Prior Publication Data

US 2007/0143965 A1 Jun. 28, 2007

(30) Foreign Application Priority Data

Dec. 23, 2005 (DE) .................. 10 2005 000 205

(51) Int. Cl.
*B25G 1/10* (2006.01)
*A45C 13/26* (2006.01)

(52) U.S. Cl. .................. 16/426; 16/431; 16/436; 173/162.2

(58) Field of Classification Search .......... 16/421, 16/426, 422, 431, 430; 173/162.1, 162.2, 173/211, 170; 81/177.1, 177.7, 489, 900; 267/137, 141, 141.4; 408/124; 409/181, 409/182

See application file for complete search history.

(56) References Cited

U.S. PATENT DOCUMENTS

| 3,266,758 A | 8/1966 | Ormond |
| 3,968,843 A * | 7/1976 | Shotwell ................. 173/210 |
| 4,768,406 A * | 9/1988 | Fitzwater ................ 81/177.1 |
| 4,967,623 A * | 11/1990 | Jackson ................... 81/44 |
| 5,052,500 A * | 10/1991 | Ohtsu .................... 173/162.2 |
| 5,769,174 A | 6/1998 | Lee et al. |
| 5,927,407 A * | 7/1999 | Gwinn et al. ........... 173/162.2 |
| 6,148,930 A * | 11/2000 | Berger et al. ........... 173/162.2 |
| 7,451,524 B2 * | 11/2008 | Sattler .................... 16/421 |
| 2001/0011846 A1 * | 8/2001 | Krondorfer et al. ......... 310/17 |
| 2002/0197939 A1 | 12/2002 | Frauhammer et al. |
| 2003/0132016 A1 | 7/2003 | Meixner et al. |

* cited by examiner

*Primary Examiner*—Chuck Y. Mah
(74) *Attorney, Agent, or Firm*—Abelman, Frayne & Schwab

(57) ABSTRACT

A handle (2; 4) for a hand-held power tool (6) includes a support member (20; 36) for securing the handle grip element (28; 48) to the hand-held power tool (6), and a decoupling device (24; 34) for at least partially vibration-decoupling of the grip element (28; 48) from the support member (20, 36) and including at least three, spaced from each other and extending parallel to each other pin-shaped decoupling elements (30; 44) for connecting the grip element (28; 48) with the support member (20; 36) and for guiding the grip element (28; 48) relative the support member (20; 36), without a position stability of the grip element being affected.

11 Claims, 2 Drawing Sheets

HANDLE FOR HAND-HELD POWER TOOL

BACKGROUND OF THE INVENTION

1. Field of the Invention

The present invention relates to a handle for hand-held power tools such as, e.g., power drill or chisel power tool having a handle that a user of a power tool can comfortably grasp. The handle has a support member to be permanently or releasably secured on the power tool. The handle grip element and the support member are connected with a decoupling device for at least partially vibration-decoupling of the grip element from the support member and for guiding the grip element relative to the support member without the position stability of the grip member being affected, i.e., the grip element retains the same orientation upon being displaced relative to the support member. The present invention also relates to a hand-held power tool with such a handle.

2. Description of the Prior Art

A handle of the type discussed above has an advantage that consists in that the decoupling takes place in one predetermined direction, while relative to other directions, a relatively stable guidance is insured. As a result, despite a substantially reduced vibration transmitted to the grip element, a reliable feeling is communicated to the tool user during guidance of the tool by the user.

German Publication DE 101 30 548 discloses an auxiliary or additional handle for a hand-held power tool in which the grip element is translationally guided in a direction parallel to the operational direction of the power tool by a support unit. To this end, the grip element is connected with a slide displaceably arranged in a rail guide against a spring element.

The drawback of the handle disclosed in the above mentioned German Publication consists in that the support unit for the translational guidance of the grip element is very expensive and rather bulky.

Accordingly, an object of the present invention is to provide a handle in which the above-mentioned drawbacks of the known handle are eliminated.

Another object of the present invention is to provide a handle that can be produced with low manufacturing costs, while insuring a comfortable handling.

SUMMARY OF THE INVENTION

These and other objects of the present invention, which will become apparent hereinafter are achieved by providing a handle with a decoupling device that includes at least three, spaced from each other and extending parallel to each other, pin-shaped decoupling elements for connecting the grip element with the support member.

With the decoupling elements extending parallel to each other, the elements are deflected parallel to each other. The decoupling elements provide for a particularly constructing simple decoupling of the grip element from the support member, with the deflectable, parallel to each other, decoupling elements simultaneously insuring a position-stable guidance of the grip element. The grip element retains the same orientation during its positive movement with respect to the support member or the hand-held power tool by the decoupling elements. In this way, a stable guidance of the power tool at a substantially reduced transmission of vibrations to the grip element is insured. In addition, with the inventive decoupling elements, the decoupling device can be formed very compact, so that it can be easily integrated in the hand-held power-tool or the auxiliary handle.

During the operation of the power tool, no obstructions, which may be caused, e.g., by tilting of the decoupling device, arise. All in all, a comfortable handling has been achieved with low manufacturing costs.

Advantageously, the pin-shaped decoupling elements are formed of a wire-shaped material, which particularly reduces the manufacturing costs.

Advantageously, as a wire-shaped material, spring steel is used. The use of the spring steel provides a decoupling device that retains substantially the same performance characteristics over its entire service life, and thus, insures a permanent comfortable reduction of vibrations applied to the grip element. Alternatively, as a wire-shaped material, a fiber-reinforced plastic material can be used. This permits to obtain particularly suitable material characteristics that result in an optimal vibration decoupling of the handle from the power tool.

Advantageously, the support member is equipped with attachment means releasably connectable with counter-attachment means provided on the power tool. Thereby, the handle can be used, if needed, as an auxiliary handle, e.g., in form of a side handle.

When the handle is used as a side handle, there are provided precisely four decoupling elements. With this number of decoupling elements, a particular good vibration decoupling simultaneously with relatively stable guidance of the grip element relative to the support member are achieved. This provides a side handle that can be handled particularly comfortably.

The objects of the invention are also achieved with a hand-held power tool equipped with the inventive handle, with the support member being permanently secured on the tool housing and the handle being mounted at a housing end remote from the working tool-side end of the housing. In this case, the inventive handle is used as a main handle which is at least partially vibration-decoupled from the rest of the power-tool by the decoupling device. In order to increase stability, a second similar or the same decoupling device spaced from the first decoupling device can be provided between the grip element and the power tool.

According to a particular advantageous embodiment of the inventive hand-held power tool, the decoupling elements extend substantially parallel to a longitudinal axis of the hand-held power tool and around a receiving space into which a drive element of the hand-held power tool at least partially projects.

In this way the space between the decoupling elements also can be used, which decreases the space occupied by the hand-held power tool.

Advantageously, precisely six decoupling elements are provided. With this number of decoupling elements, a particular stable guidance of the grip element relative to the support member simultaneously with relatively good vibration decoupling are achieved, whereby a particularly comfortably handled main handle is provided.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
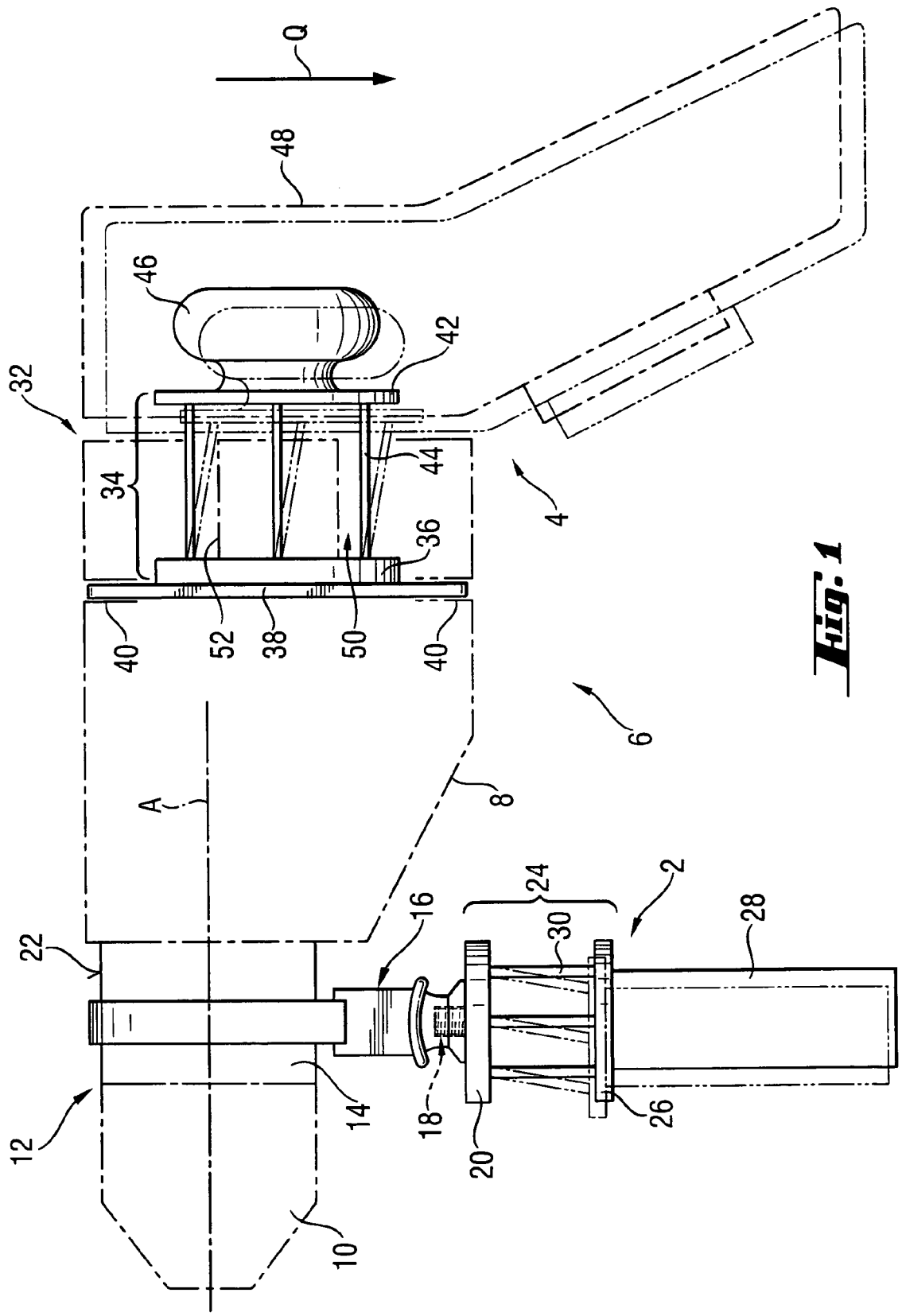
FIG. 1 a side elevational view of a hand-held power tool with a main handle with a decoupling device according to the present invention and a side handle with a decoupling device according to the present invention.

FIG. 1 shows a main handle 4 of a hand-held power tool 6 in form of power drill or chisel tool and a side handle-forming additional handle 2 used only when needed. The additional handle 2 and the main handle 4 can also be used on a scroll saw or a grinder, in particular, angle grinder.

The hand-held power tool 6 has a housing 8 that extends substantially along longitudinal axis A. At its first end 12 adjacent to the chuck 10 for receiving a working tool, the housing 8 has a neck 14 on which the additional hand 2 is secured. To this end, the additional handle 2 has first attachment means 16 in form of a locking device that is connected by screw means 18 with a plate-shaped support member 20. The first attachment means 16 are releasably tightened on a cylindrical surface of the housing neck 14 that serves as first counter-attachment means 22.

The plate-shaped support member 20 forms a part, which is fixedly connected with the housing 8, of a first decoupling device generally designated with a reference numeral 24. The first decoupling device 24 has further a connection member 26 fixedly secured on a first grip element 28 formed as a grip sleeve. The connection number 26 is held on the first support member 20 with pin-shaped first decoupling elements 30 formed of a spring steel wire.

At the second end 32 of the housing 8 remote from the first end 12, there is provided a second decoupling device generally designated with reference numeral 34. The second decoupling device 34 has a second support member 36 that is fixedly connected with second attachment means 38 in form of a support plate. The second attachment means 38 is secured on the housing 8 with second counter-attachment means 40 that is formed as a groove-shaped receptacle.

The second decoupling device 34 further has a second connection element 42 that is held on the second support member 36 with three pin-shaped decoupling elements 44 formed of spring steel wire. Instead of the spring steel wire, the first decoupling elements 30 and the second decoupling elements 44 can be formed of fiber-reinforced plastic materials.

A support knob 46 is provided on the connection element 42. A grip element 48 that is formed as a grip housing and forms the main handle 4 of the hand-held power tool 6, is secured on the support knob 46 in a manner not shown in detail.

As shown in FIG. 1, the second decoupling elements 44 surround a receiving space 50 into which a drive element 52 of the hand-held power tool 6 partially projects. The drive element 52 can be formed by a motor, a gear drive, a percussion mechanism, or as a subhousing part.

During operation, the housing 8 is subjected to vibrations acting parallel to the longitudinal axis A and in direction Q transverse to the longitudinal axis A.

With the first decoupling elements 30, the first grip element 28 can be displaced, as shown with dash-dot lines, relative to the first support member 20 or the hand-held power tool 6. The first grip element 28 is positively guided with the elastically deflectable first decoupling elements 30 of the first decoupling device 24, with the first decoupling elements 30 extending all the time parallel to each other also during the swinging-out movement. Thus, the first grip element 28 always extends transverse to the longitudinal axis A, being displaced substantially parallel thereto.

In this way, the first grip element 28 decouples to a most possible extent the vibrations which are generated during the operation of the hand-held tool 6 and act in the direction of the longitudinal axis A, while providing for a relatively stable guidance in the transverse direction.

Simultaneously, during the operation of the hand-held power tool 6, the second grip element 48 can be displaced, as shown with dash-double dot lines, by the second decoupling device 34 relative to the second support member 36 or the hand-held power tool 6. The second grip element 48 is displaced by the elastically deflectable second decoupling elements 44 of the second decoupling device 34, with the second decoupling elements 44 extending all the time parallel to each other during the swinging out movement. In this way, the second connection element 42, together with the supported thereon second grip element 48, constantly extends perpendicular to the longitudinal axis, being guided parallel to the transverse direction Q.

Thereby, the second grip element 48 decouples, to a most possible extent, the vibrations, which are generated during the operation of the hand-held power tool, in the transverse direction Q, while providing a relatively stable guidance in the direction of the longitudinal axis A by the second grip element 48.

In addition, both decoupling devices 24, 34 provide for vibration decoupling in a lateral direction, not shown in detail, that extends transverse to both the longitudinal direction A and the transverse direction Q. Thereby usually only very small vibrations act in this lateral direction.

As an alternate to the embodiment shown in the drawings with the respective decoupling device 24, 34 being provided on the additional handle 2 and the main handle 4, respectively, it is possible to provide only one of the two handles 2, 4 with a corresponding decoupling device 24, 34. It is further possible to form the main handle 4 as a D-shaped handle, providing the decoupling device 34 at both support points.

Figure 2:
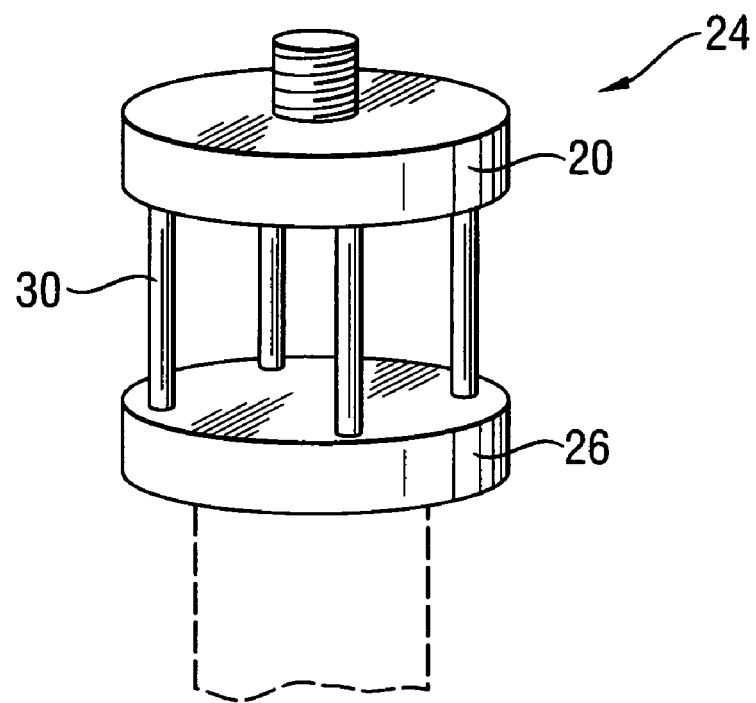
FIG. 2 a perspective view of an alternative embodiment of a decoupling device of a side handle with four decoupling elements.

FIG. 2 shows an alternative embodiment of the first decoupling device 24 with particularly good vibration-isolating characteristics. In this embodiment, four first decoupling elements 30 are provided between the support member 20 and the connection member 26.

Figure 3:
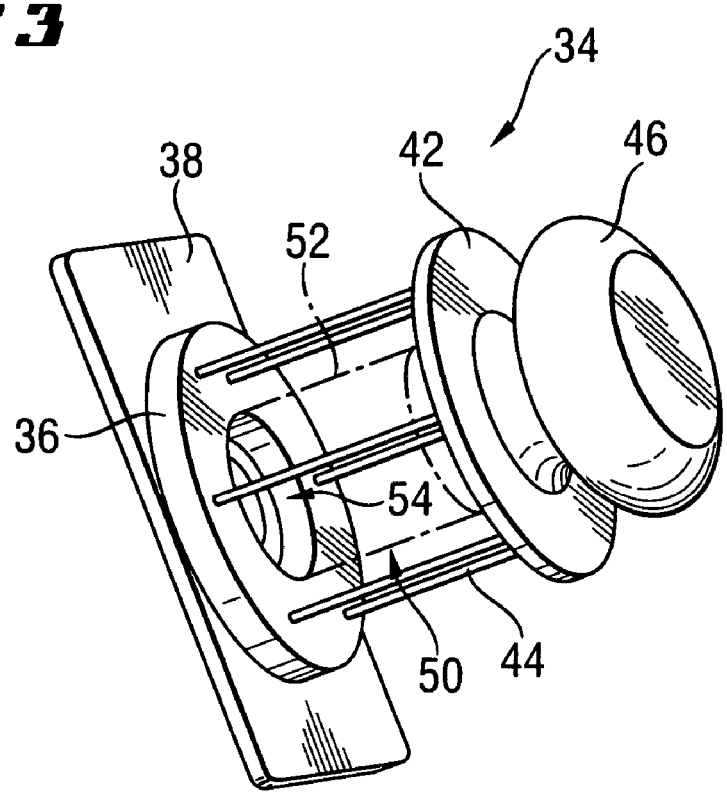
FIG. 3 a perspective view of an alternative embodiment of a decoupling device of a main handle according to the present invention with six decoupling elements.

FIG. 3 shows an alternative embodiment of the second decoupling device 34 with a particular high stability. In this embodiment, between the second support member 36 and the second connection member 42, there are provided six decoupling elements 44. Further, a through-opening 54 is provided in the support member 36 and the attachment element 38 through which a drive element 52 projects into receiving space 50, which insures a compact construction of the hand-held power tool 6.

Although the present invention was shown and described with references to the preferred embodiments, these are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A handle (2; 4) for a hand-held power tool (6) comprising:
   a grip element (28; 48);
   a support member (20; 36) for securing the grip element (28; 48) to the hand-held power tool (6); and
   a decoupling device (24; 34) for at least partially vibration-decoupling of the grip element (28; 48) from the support member (20, 36) and including at least three, spaced from each other and extending parallel to each other pin-shaped decoupling elements (30; 44) for connecting the grip element (28; 48) with the support member (20; 36) and for guiding the grip element (28; 48) relative the support member (20; 36), without changing orientation of the grip element relative to the support member.

2. A handle according to claim 1, wherein the pin-shaped decoupling elements (30; 44) are formed of a wire-shaped material.

3. A handle according to claim 2, wherein the wire-shape material is formed by spring steel.

4. A handle according to claim 2, wherein the wire-shaped material is formed of a fiber-reinforced plastic material.

5. A handle according to claim 1, further comprising attachment means (16) provided on the support member (20) and releasably connectable with counter-attachment means (22) provided on the hand-held power tool (6).

6. A handle according to claim 1, wherein the decoupling device (24) includes precisely four decoupling elements (30).

7. A handle according to claim 1, wherein the pin-shaped decoupling elements (30; 44) are deflectable parallel to each other for guiding the grip element (28; 48) relative to the support member (20; 36).

8. A hand-held power tool, comprising a housing (8); and a handle (4) provided at an end (32) of the housing (8) remote from a working tool-side housing end (12) and having a grip element (28; 48), a support member (20; 36) for securing the grip element (28; 48) to the hand-held power tool (6) and permanently secured on the housing (8), and a decoupling device (24; 34) for at least partially vibration-decoupling of the grip element from the support member (20, 36) and including at least three, spaced from each other and extending parallel to each other, pin-shaped decoupling elements (30; 44) for connecting the grip element (28; 48) with the support member (20; 36) and for guiding the grip element (28; 48) relative the support member (20; 36), without changing orientation of the grip element relative to the support member.

9. A hand-held power tool according to claim 8, wherein the decoupling elements (44) extend substantially parallel to a longitudinal axis (A) of the hand-held power tool (6) and around a receiving space (50) into which a drive element (52) of the hand-held power tool (6) at least partially projects.

10. A hand-held power tool (6) according to claim 8, wherein the decoupling device (34) of the handle (4) has precisely six decoupling elements (44).

11. A hand-held power tool according to claim 8, wherein the pin-shaped decoupling elements (30; 44) are deflectable parallel to each other for guiding the grip element (28; 48) relative to the support member (20; 36).

\* \* \* \* \*